(12) United States Patent
Xu et al.

(10) Patent No.: US 11,748,185 B2
(45) Date of Patent: Sep. 5, 2023

(54) MULTI-FACTOR CLOUD SERVICE STORAGE DEVICE ERROR PREDICTION

(71) Applicant: Microsoft Technology Licensing, LLC, Redmond, WA (US)

(72) Inventors: Yong Xu, Beijing (CN); Qingwei Lin, Beijing (CN); Kaixin Sui, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 114 days.

(21) Appl. No.: 17/056,721

(22) PCT Filed: Jun. 29, 2018

(86) PCT No.: PCT/CN2018/093768
§ 371 (c)(1),
(2) Date: Nov. 18, 2020

(87) PCT Pub. No.: WO2020/000404
PCT Pub. Date: Jan. 2, 2020

(65) Prior Publication Data
US 2021/0200616 A1 Jul. 1, 2021

(51) Int. Cl.
*G06F 11/00* (2006.01)
*G06F 11/07* (2006.01)
(Continued)

(52) U.S. Cl.
CPC ........ *G06F 11/0751* (2013.01); *G06F 3/0617* (2013.01); *G06F 3/0647* (2013.01);
(Continued)

(58) Field of Classification Search
None
See application file for complete search history.

(56) References Cited

U.S. PATENT DOCUMENTS 7,236,911 B1* 6/2007 Gough .............. G06F 11/008 702/123
8,316,263 B1* 11/2012 Gough .............. G06F 11/008 706/21
(Continued)

FOREIGN PATENT DOCUMENTS

CN 102129397 A 7/2011
CN 107392320 11/2017
(Continued)

OTHER PUBLICATIONS

Google Scholar/Patents search—text refined (Year: 2022).*
(Continued)

*Primary Examiner* — Christopher S McCarthy
(74) *Attorney, Agent, or Firm* — Schwegman Lundberg & Woessner, P.A.

(57) ABSTRACT

Systems and techniques for multi-factor cloud service storage device error prediction are described herein. A set of storage device metrics and a set of computing system metrics may be obtained. A feature set may be generated using the set of storage device metrics and the set of computing system metrics. Members of the feature set may be validated by evaluating a validation training dataset using the members of the feature set. A modified feature set may be created based on the validation. A storage device failure model may be created using the modified feature set. A storage device rating range may be determined by minimizing a cost of misclassification of a storage device. A set of storage devices to be labeled may be identified as having a high probability of failure.

17 Claims, 5 Drawing Sheets

(51) Int. Cl.
G06F 3/06 (2006.01)
G06F 11/30 (2006.01)
G06F 11/34 (2006.01)

(52) U.S. Cl.
CPC ........ *G06F 3/0683* (2013.01); *G06F 11/3034* (2013.01); *G06F 11/3457* (2013.01)

(56) References Cited

U.S. PATENT DOCUMENTS

| | | | |
|---|---|---|---|
| 9,189,309 B1* | 11/2015 | Ma | G06F 11/008 |
| 9,229,796 B1 | 1/2016 | Ma et al. | |
| 9,542,296 B1* | 1/2017 | Engers | G06F 11/008 |
| 9,720,763 B2 | 8/2017 | Rajasekharan et al. | |
| 10,223,230 B2* | 3/2019 | Jacoby | G06F 11/008 |
| 2015/0067410 A1 | 3/2015 | Kumar et al. | |
| 2018/0032385 A1 | 2/2018 | Shivaji et al. | |
| 2018/0081571 A1 | 3/2018 | Akshara | |
| 2019/0121685 A1* | 4/2019 | Coutinho | G06F 11/3452 |

FOREIGN PATENT DOCUMENTS

| | | |
|---|---|---|
| CN | 108052528 A | 5/2018 |
| WO | 2017129030 A1 | 8/2017 |
| WO | 2017129032 A1 | 8/2017 |

OTHER PUBLICATIONS

Google Scholar/Patents search—text refined (Year: 2023).*
"Extended European Search Report Issued in European Patent Application No. 18924435.3", dated Dec. 15, 2021, 17 Pages.
Aussel, et al., "Predictive models of hard drive failures based on operational data", in Proceedings of the 16th IEEE International Conference on Machine Learning and Application, Dec. 18, 2017, pp. 619-625.
"Azure Cosmos DB", Retrieved From: https://web.archive.org/web/20191112124528/https://azure.microsoft.com/en-au/services/cosmos-db/, Nov. 12, 2019, 21 Pages.
"Cost of Data Center Outages", Retrieved from: https://planetaklimata.com.ua/instr/Liebert_Hiross/Cost_of_Data_Center_Outages_2016_Eng.pdf, Jan. 2016, 21 Pages.
"Hard Drive Test Data—Determining Failure Rates and More", Retrieved From: https://web.archive.org/web/20160708113226/https://www.backblaze.com/b2/hard-drive-test-data.html, Jul. 8, 2016, 4 Pages.
"Microsoft Azure Machine Learning Studio", Retrieved From: https://web.archive.org/web/20180320211327/https://studio.azureml.net/, Mar. 20, 2018, 2 Pages.
"Receiver Operating Characteristic", Retrieved From: https://web.archive.org/web/20180322004454/https://en.wikipedia.org/wiki/Receiver_operating_characteristic, Mar. 22, 2013, 7 Pages.
Bairavasundaram, et al., "An Analysis of Latent Sector Errors in Disk Drives", in Proceedings of the ACM Sigmetrics International Conference on Measurement and Modeling of Computer Systems, Jun. 12, 2007, pp. 239-300.
Borah, et al., "Enhanced Rules Framework for Predicting Disk Drives Failure", in International Journal of Computer Science and Mobile Computing, vol. 5, Issue 7, Jul. 2016, pp. 177-185.
Botezatu, et al., "Predicting Disk Replacement towards Reliable Data Centers", in Proceedings of the 22nd ACM SIGKDD International Conference on Knowledge Discovery and Data Mining, Aug. 13, 2016, pp. 39-48.
Chawla, et al., "SMOTE: Synthetic Minority Over-Sampling Technique", in Journal of Artificial Intelligence Research, vol. 16, Jun. 1, 2002, pp. 321-357.
Chen, et al., "Failure Prediction of Jobs in Compute Clouds: A Google Cluster Case Study", in Proceedings of IEEE International Symposium on Software Reliability Engineering Workshops, Nov. 3, 2014, pp. 341-346.

Domingos, Pedro, "MetaCost: A General Method for Making Classifiers Cost-Sensitive", in Proceedings of the Fifth ACM SIGKDD International Conference on Knowledge Discovery and Data Mining, Aug. 15, 1999, pp. 155-164.
Ford, et al., "Availability in Globally Distributed Storage Systems", in Proceedings of 9th USENIX Symposium on Operating Systems Design and Implementation, Oct. 4, 2010, 14 Pages.
Friedman, Jeromeh., "Greedy Function Approximation: A Gradient Boosting Machine", in Journal of Annals of Statistics, vol. 29, issue 5, Oct. 1, 2001, pp. 1189-1232.
Gaber, et al., "Predicting HDD Failures from Compound Smart Attributes", in Proceedings of the 10th ACM International Systems and Storage Conference, May 22, 2017, 1 Page.
Gehrer, Millian, "Predicting Disk Failures for Reliable Clouds", Retrieved from: https://www.IBM.com/blogs/research/2016/08/predicting-disk-failures-reliable-clouds/, Aug. 13, 2016, 6 Pages.
Genuer, et al., "Variable Selection Using Random Forests", In Journal of Pattern Recognition Letters, vol. 31, Issue 14, Oct. 15, 2010, 10 Pages.
Goldszmidt, Moises, "Finding Soon-to-Fail Disks in a Haystack", in Proceedings of the 4th USENIX Conference on Hot Topics in Storage and File Systems, Jun. 13, 2012, 5 Pages.
Guyon, et al., "An Introduction to Variable and Feature Selection", in Journal of Machine Learning Research, vol. 3, Mar. 2003, pp. 1157-1182.
Huang, et al., "Gray Failure: The Achilles' Heel of Cloud-Scale Systems", in Proceedings of the 16th Workshop on Hot Topics in Operating Systems, May 8, 2017, pp. 150-155.
Klein, Andy, "Hard Drive Stats for Q3 2017", Retrieved From: https://web.archive.org/web/20171112230258/https://www.backblaze.com/blog/hard-drive-failure-rates-q3-2017/, Oct. 26, 2017, 7 Pages.
Li, et al., "Hard Drive Failure Prediction Using Classification and Regression Trees", in Proceedings of 44th Annual IEEE/IFIP International Conference on Dependable Systems and Networks, Jun. 23, 2014, pp. 383-394.
Liu, Tie-Yan, "Learning to Rank for information Retrieval", in Journal of Foundations and Trends in Information Retrieval, vol. 3, issue 3, Mar. 2009, pp. 225-331.
Mahdisoltani, et al., "Proactive Error Prediction to Improve Storage System Reliability", in Proceedings of USENIX Annual Technical Conference, Jul. 12, 2017, pp. 391-402.
Meza, et al., "A Large-Scale Study of Flash Memory Failures in the Field", in Proceedings of ACM Sigmetrics International Conference on Measurement and Modeling of Computer Systems, Jun. 15, 2015, pp. 177-190.
Murray, et al., "Machine Learning Methods for Predicting Failures in Hard Drives: A Multiple-Instance Application", in Journal of Machine Learning Research, vol. 6, May 2005, pp. 783-816.
Patterson, et al., "A Case for Redundant Arrays of Inexpensive Disks (RAID)", in Proceedings of ACM SIGMOD International Conference on Management of Data, Jun. 1, 1988, pp. 109-116.
"International Search Report and Written Opinion issued in PCT Application No. PCT/CN18/093768", dated Mar. 28, 2019, 6 Pages.
Pinheiro, et al., "Failure Trends in a Large Disk Drive Population", in Proceedings of the 5th USENIX Conference on File and Storage Technologies, Feb. 13, 2007, pp. 17-28.
Pitakrat, et al., "A Comparison of Machine Learning Algorithms for Proactive Hard Disk Drive Failure Detection", in Proceedings of the 4th International ACM Sigsoft Symposium on Architecting Critical Systems, Jun. 17, 2013, 10 Pages.
Sapre, et al., "A Proactive Drive Reliability Model to Predict Failures in The Hard Disk Drives", in International Journal of Advanced Computational Engineering and Networking, vol. 2, Issue 9, Sep. 2014, pp. 62-68.
Schroeder, et al., "Disk Failures in the Real World: What Does an MTTF of 1,000,090 Hours Mean to You?", in Proceedings of the 5th USENIX conference on File and Storage Technologies, Feb. 13, 2007, 16 Pages.
Schroeder, et al., "Flash Reliability in Production: The Expected and the Unexpected", in Proceedings of 14th USENIX Conference on File and Storage Technologies, Feb. 22, 2016, pp. 67-80.

(56) References Cited

OTHER PUBLICATIONS

Steen, et al., "microsoftmi.rx_fast_trees: Boosted Trees", Retrieved From: https://docs.microsoft.com/en-us/machine-learning-server/python-reference/microsoftmi/rx-fast-trees, Jul. 15, 2019, 11 Pages.

Tan, et al., "Online Defect Prediction for Imbalanced Data", in Proceedings of the 37th International Conference on Software Engineering, vol. 2, May 16, 2015, pp. 99-108.

Tantithamthavorn, et al., "Comments on "Researcher Bias: The Use of Machine Learning in Software Defect Prediction"", in Journal of IEEE Transactions on Software Engineering, vol. 42, issue 11, Nov. 2016, pp. 1092-1094.

Vishwanath, et al., "Characterizing Cloud Computing Hardware Reliability", in Proceedings of the 1st ACM Symposium on Cloud Computing, Jun. 10, 2010, pp. 193-203.

Wang, et al., "Online Anomaly Detection for Hard Disk Drives Based on Mahalanobis Distance", in Journal of IEEE Transactions on Reliability, vol. 62, Issue 1, Mar. 2013, pp. 136-145.

Xu, et al., "Health Status Assessment and Failure Prediction for Hard Drives with Recurrent Neural Networks", in Journal of IEEE Transactions on Computers, vol. 65, Issue 11, Nov. 2016, pp. 3502-3508.

Xu, et al., "Improving Service Availability of Cloud Systems by Predicting Disk Error", in Proceedings of USENIX Annual Technical Conference, Jul. 11, 2018, pp. 481-493.

Xu, et al., "Smart Ring: A Model of Node Failure Detection in High Available Cloud Data Center", in Proceedings of 9th IFIP International Conference on Network and Parallel Computing, Sep. 6, 2012, pp. 279-288.

Zhang, et al., "Failure prediction in IBM BlueGene/L event logs", in Proceedings of 22nd IEEE International Symposium on Parallel and Distributed Processing, Apr. 14, 2008, 5 Pages.

Zhu, et al., "Proactive Drive Failure Prediction for Large Scale Storage Systems", in Proceedings of IEEE 29th Symposium on Mass Storage Systems and Technologies, May 6, 2013, 5 Pages.

"S.M.A.R.T.", Retrieved From: https://web.archive.org/web/20180306094958/https://en.wikipedia.org/wiki/S.M.A.R.T., Mar. 6, 2018, 19 Pages.

"Office Action Issued in Indian Patent Application No. 202017053910", dated Sep. 5, 2022, 10 Pages.

"Office Action issued in European Patent Application No. 18924435.3", dated Apr. 11, 2023, 8 Pages.

* cited by examiner

MULTI-FACTOR CLOUD SERVICE STORAGE DEVICE ERROR PREDICTION

CROSS-REFERENCE TO RELATED APPLICATION

This application is a U.S. National Stage Filing under 35 U.S.C. 371 of International Patent Application Serial No. PCT/CN2018/093768, filed Jun. 29, 2018, and published as WO 2020/000404 A1 on Jan. 2, 2020, which application and publication are incorporated herein by reference in their entirety.

TECHNICAL FIELD

Embodiments described herein generally relate to computer disk error detection and, in some embodiments, more specifically to multi-factor storage device error prediction.

BACKGROUND

Cloud service providers maintain data storage, computing, and networking service for use by entities outside of the service provider organization. The data storage may include clusters of storage devices (e.g., hard disk drives, solid state drives, non-volatile memory, etc.). The computing service may include clusters of computing nodes hosting virtual computer devices each using a portion of the computing hardware available to the computing node or cluster. The networking service may include virtual network infrastructure for interconnecting virtual computing devices. The operating system and data of a given virtual computing device may be located one or more storage devices distributed among the data storage system. If a storage device holding the operating system or data of the virtual computing device experiences an error, the virtual computing device may experience an unexpected shutdown or may experience operational problems (e.g., loss of services, slow response times, data loss, errors, etc.). Detection and replacement of storage devices that are experiencing error may allow the cloud service provider to relocate the resources of the virtual computing device to a different storage device to mitigate service disruptions.

Self-monitoring, analysis and reporting technology (S.M.A.R.T.) is a monitoring system that is included in some types of storage devices. S.M.A.R.T. may monitor a storage device and may provide notification of storage device errors. S.M.A.R.T. errors may provide an indication of a drive that is failing. However, by the time S.M.A.R.T. error reporting has been triggered, a virtual computing device that is using the storage device may already be experiencing a service interruption.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
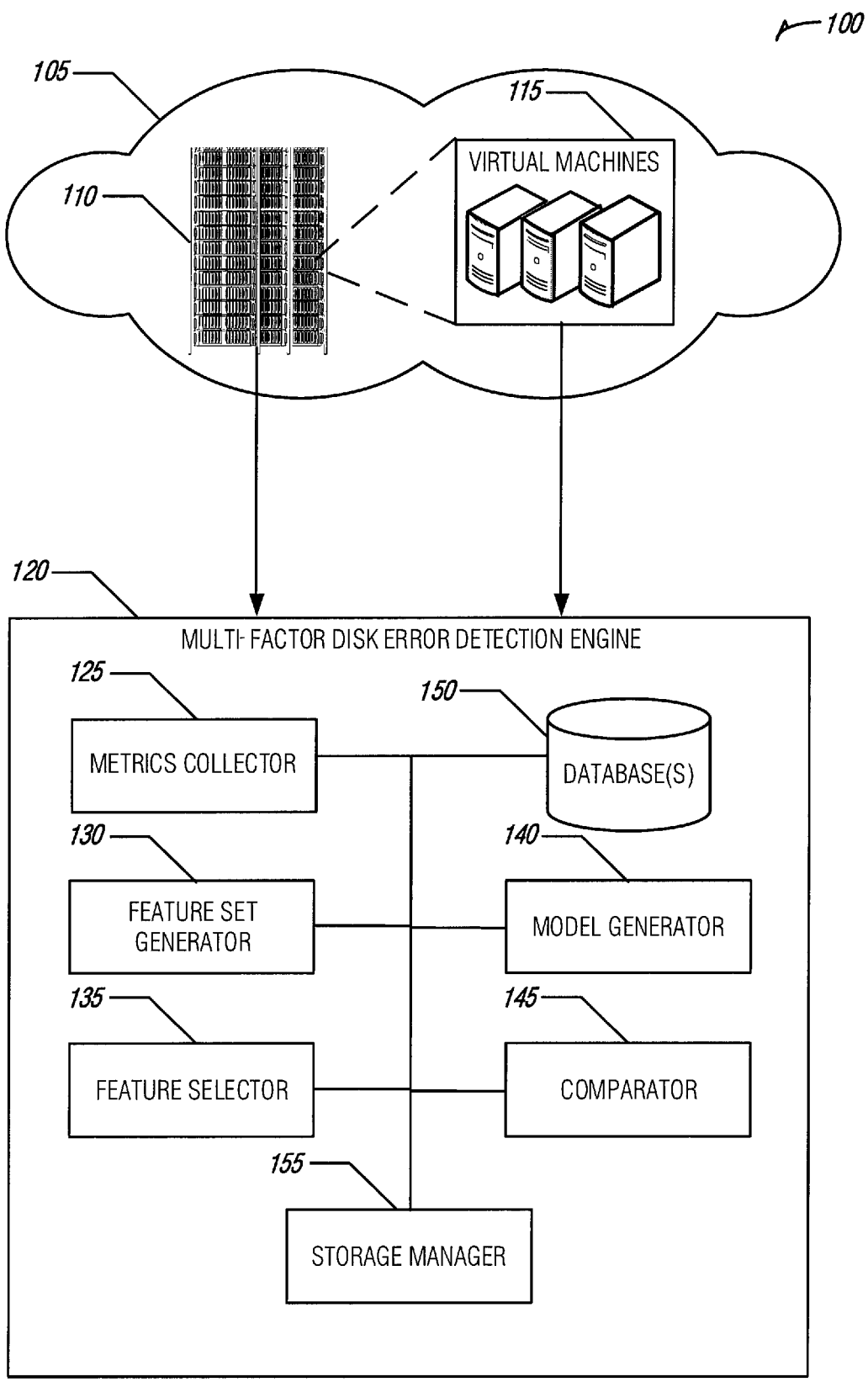
FIG. 1 is a block diagram of an example of an environment and a system for multi-factor cloud service storage device error prediction, according to an embodiment.

High service availability is crucial for cloud systems. A typical cloud system uses a large number of physical storage devices. As used herein, the term storage device refers to any persistent storage medium used in a cloud storage system. Storage devices may include, for example, hard disk drives (HDDs), solid state drives (SSDs), non-volatile memory (e.g., according to NVM Express® (NVMe) standard, Non-Volatile Memory Host Controller Interface Specification (NVMHCIS) standard, etc.), etc.

Storage device errors may be a leading cause of service unavailability for a cloud service provider. Storage device errors (e.g., sector errors, latency errors, etc.) may be considered as a form of gray failure which may be subtle failures that are hard to detect even when they lead to application errors. The systems and techniques discussed herein may reduce service outages due to storage device errors by predicting storage device errors proactively before they cause more severe damage to the cloud system. The ability to predict faulty storage devices enables the live migration of existing virtual machines (VMs) (e.g., virtual computing devices, etc.) and allocation of new virtual machines to healthy storage devices.

Proactively moving workloads to healthy storage devices may also improve service availability. To build an accurate online prediction model, both storage device-level sensor (S.M.A.R.T.) data and system-level signals are evaluated to identify storage devices that may be likely to fail. A cost-sensitive ranking-based machine learning model is used that may learn the characteristics of previous faulty storage devices and rank the current storage devices based on how likely they are to experience errors in the near term. The solution discussed herein outperforms traditional ways of detecting storage device errors by including system-level signals. An individual system-level signal may not be indicative of a failure by itself. However, a combination of system-level signals and storage device-level sensor data may provide an indication of the likelihood of failure of a storage device. The system-level factors and storage device-level factors may be evaluated against a failure prediction model. The failure prediction model may represent a multi-factor analysis model that may determine the probability that a given storage device will fail. The collection and analysis of system-level and storage device-level data may result in more accurate prediction of storage device failure than a single factor analysis including either storage device-level data or system-level data.

In recent years, software applications are being increasingly deployed as online services on cloud computing platforms. Cloud service platforms may be used by millions of users around the world on a 24/7/365 basis. Therefore, high availability has become essential to cloud-based service providers. Although many cloud service providers target a high service availability (e.g., 99.999% uptime, etc.), services may fail and cause great user dissatisfaction and revenue loss. For example, according to a study conducted with data from sixty-three data center organizations in the United States, the average cost of downtime has steadily increased from $505,502 per hour in 2010 to $740,357 per hour in 2016.

There are several traditional storage device error detection solutions available. For example, some existing approaches have attempted to train a prediction model from historical storage device failure data and use the trained model to predict if a storage device will fail (e.g., whether a storage device will be operational or not) in near future. Proactive remediation, such as replacement of failure-prone storage devices, may then be taken. However, the prediction model is mainly built using the S.M.A.R.T. data, which is storage device-level sensor data provided by firmware embedded in storage device drives.

These existing approaches may focus on predicting complete storage device failure (e.g., is the storage device operational/not operational). However, in a cloud environment, before complete storage device failure, upper-layer services may already be impacted by storage device errors (e.g., experiencing latency errors, timeout errors, sector errors, etc.). The symptoms may include, for example, file operation errors, a VM not responding to communication requests, etc. These subtle failures may not trigger quick and definitive detection by a storage device error detection system If no actions are taken, more severe problems or service interruptions may occur. Early prediction of disk failure using the solution discussed herein may allow for proactive remediation includes for example, error-aware VM allocation (e.g., allocating VMs to healthier storage devices), live VM migration (e.g., moving a VM from a faulty storage device to a healthy storage device), or the like. This may allow the storage device to be taken out of service before developing an error that may cause a service interruption.

Storage device errors may be reflected by system-level signals such as operating system (OS) events. A prediction algorithm may be used in ranking the health of storage devices in the cloud storage system that incorporates both S.M.A.R.T. data and system-level signals. Machine learning algorithms may be used to train a prediction model using historical data. The output is a model built to predict storage devices that are likely to fail in the near term. The prediction model may be used to rank all storage devices according to the degree of error-proneness of each storage device so that the cloud service computing system may allocate new VMs and migrate existing VMs to storage devices ranked as most healthy, under the constrains of cost and capacity.

Predicting storage device errors in a cloud service storage system poses challenges. Imbalanced data in a cloud storage system makes prediction more difficult. For example, 300 of 1,000,000 storage devices may fail each day. Removing healthy storage devices from the system is costly and may result in an undue loss of capacity. Thus, a cost-sensitive ranking model is used to address this challenge. The storage devices are ranked according to their error-proneness and the faulty drives are identified by minimizing the total cost. Using the cost-sensitive ranking model, the top r most error-prone storage devices may be identified rather than classifying error prone storage devices as faulty. In this way, error-prone storage devices may be removed from the cloud storage system in a cost effective manner that more closely represents actual expected failure rates.

Some features, especially system-level signals, may be time-sensitive (e.g., values keep changing drastically over time) or environment-sensitive (e.g., their data distribution would significantly change due to the ever-changing cloud environment). Models built using these unstable features may lead to favorable results in cross-validation (e.g., randomly dividing data into training and testing sets) but perform poorly in real-world online prediction (e.g., dividing data into training and testing sets by time). To address this challenge, systematic feature engineering is performed using a unique feature selection technique for selecting stable and predictive features.

The systems and techniques disclosed herein provide more robust and earlier storage device error detection and mitigation than traditional storage device error detection solutions. A multi-factor evaluation of storage devices in the cloud storage systems is performed. Both system-level factors and storage device-level factors are evaluated using a unique feature selection model to select storage-device-failure predictive features. A cost-sensitive ranking model is used for ranking storage devices according to their error-proneness. The benefit of this solution is that error-prone storage devices are identified early and may be removed from the cloud storage system before a storage device causes system downtime. By using cost-sensitive ranking, error-prone storage devices may be removed from the cloud storage system at rates that approximate expected actual failure rates which may minimize the cost of early removal of storage devices for the cloud storage provider.

FIG. 1 is a block diagram of an example of an environment 100 and a system 120 for multi-factor cloud service storage device error prediction, according to an embodiment. The environment 100 may include a cloud service infrastructure 105 including a cloud storage system 110 (e.g., a storage area network (SAN), hyperconverged computing system, redundant array of inexpensive storage devices (RAID) array, etc.) that includes a plurality of storage devices holding operating system (OS) data and other data for virtual machines (VMs) (e.g., virtual computing device sharing physical computing hardware of a host computing node, etc.) 115.

The cloud storage system 110 and the virtual machines 115 may be communicatively coupled (e.g., via wired network, wireless network, cellular network, shared bus, etc.) to the system 120. In an example, the system 120 may be a multi-factor storage device error detection engine. The system 120 may include a variety of components such as a metrics collector 125, a feature set generator 130, a feature selector 135, a model generator 140, a comparator 145, database(s) 150, and a storage manager 155.

The cloud storage system 110 may contain as many as hundreds of millions of storage devices serving various kinds of services and applications. Storage devices may be used in various types of clusters such as, for example, clusters for data storage and clusters for cloud applications. Data storage clusters may use redundancy mechanisms such as redundant arrays of inexpensive storage devices (RAID) techniques that may increase storage device failure tolerance. Cloud application clusters may host a significant number of virtual machines 115, and as will be understood, storage device errors may result in undesirable disruptions to the services and applications hosted by the virtual machines 115. The techniques discussed herein may reduce disruptions by predicting storage device errors before they result in service failure.

Service outages may lead to revenue loss and user dissatisfaction. Thus, service providers make every effort to improve service availability. For example, service providers may seek to increase reliability from "four nines" (e.g., 99.99%) to "five nines" (e.g., 99.999%), and then to "six nines" (e.g., 99.9999%). Storage devices are among the most frequently failing components in the cloud service infrastructure 105 and are, therefore, an important focus of efforts to increase reliability.

Automatic prediction of the occurrence of storage device failure may allow a cloud service provider to avoid storage device errors that result in system failures (e.g., impact to operation of the virtual machines 115, etc.). In this way, proactive measures, such as storage device replacement, may be taken. Traditional storage device error prediction solutions may use self-monitoring, analysis, and reporting technology (S.M.A.R.T.) data, which monitors internal attributes of individual storage devices, to build a failure prediction model.

However, before a storage device completely fails, the storage device may have already started reporting errors. There are various storage device errors such as, for example storage device partition errors (e.g., storage device volumes and volume size become abnormal), latency errors (e.g., the unexpected long delay between a request for data and the return of the data), timeout errors (e.g., exceeding the predefined storage device timeout value), and sector errors (e.g., individual sectors on a storage device become unavailable), etc. Storage device failures may be detected by conventional system failure detection mechanisms. However, these conventional mechanisms often assume an overly simple failure model in which a storage device is either operational or failed. Such conventional mechanisms are inadequate to deal with storage device errors as they may manifest as subtle gray failures.

Storage device errors are common and may impact normal operation of upper-layer applications and may result in unexpected VM 115 downtime. The symptoms may include I/O request timeout, VM 115 or a container not responding to communication requests, etc. If no actions are taken, more severe problems or even service interruptions may occur. Therefore, it is important that storage device errors be captured and predicted before a VM 115 error occurs.

The metrics collector 125 may obtain a set of storage device metrics from storage devices in the cloud storage system 110 and a set of computing system metrics from the virtual machines 115. The metrics collector 125 may store the obtained metrics in the database(s) 150 (e.g., arranged by relationships between metrics and physical storage device, etc.). Two categories of data are collected, storage device metrics (e.g., S.M.A.R.T. data, etc.) and computing system metrics (e.g., system-level signals, etc.). For example, S.M.A.R.T. data may be obtained from a monitoring firmware of each storage device which allows the storage device to report data about its internal activity. Table 1 provides some examples of S.M.A.R.T. features.

TABLE 1

| S.M.A.R.T. | Description |
| --- | --- |
| S2 | Start/Stop Count |
| S12 | Power Cycle Count |
| S193 | Load Cycle Count |
| S187 | The number of read errors that could not be recovered using hardware ECC |
| S5 | Count of reallocated sectors. When a read or a write operation on a sector fails, the drive will mark the sector as bad and remap (reallocate) it to a spare sector on storage device. |
| S196 | The total count of attempts to transfer data from reallocated sectors to a spare area. Unsuccessful attempts are counted as well as successful. |

TABLE 1-continued

In cloud systems, there are also various system-level events, which may be collected periodically (e.g., hourly, etc.). Many of these system-level events, such as for example, OS events, file system operation errors, unexpected telemetry loss, etc., are early signals of storage device errors. Table 2 gives the descriptions of some system-level signals. In an example, the set of computing system metrics includes system-level signals from virtual machines with operating system data residing on storage devices in a cloud computing storage system. For example, a FileSystemError is an event that is caused by storage device related errors, which may be traced back to bad sectors or storage device integrity corruption. These computing system metrics may correspond to a storage device containing data of the virtual machines 115 and may be included in the computing system metrics.

TABLE 2

| Signal | Description |
| --- | --- |
| PagingError | Windows encounters an error in creating a paging file. |
| FileSystem-Error | An error occurs when trying to read, write, or open a file. |
| DeviceReset | Device is forced to reset or shutdown. |
| TelemetryLoss | Telemetry data cannot be captured over a period. |
| DataExchange-Disabled | The data exchange integration service cannot be enabled or initialized. |
| VMFrozen | VM is unresponsive to communication request |
| Windows Event 129 | A Windows event log caused by dropped requests. |

The feature set generator 130 may generate a feature set using the set of storage device metrics and the set of computing system metrics. The feature set may be stored in the database(s) 150. Apart from the features that are directly identified from the raw data, some statistical features are calculated such as:

Diff: Changes in a feature value over time may be useful for distinguishing storage device errors. Given a time window w, Diff of feature x at time stamp t is defined as follows:

$$\text{Diff}(x,t,w) = x(t) - x(t-w)$$

Sigma: Sigma calculates the variance of attribute values within a period. Given a time window w, Sigma of attribute x at time stamp t is defined as:

$$\text{Sigma}(x, t, w) = E[(X - \mu)^2],$$

where $X = (xt - w, xt - w - 1, \ldots, xt)$ and $\mu = \frac{\sum (X)}{w}$.

Bin: Bin calculates the sum of attribute values within a window w as follows:

$$\text{Bin}(x, t, w) = \sum_{j=t-w+1}^{t} x(j)$$

Three different window sizes (e.g., 3, 5, 7) may be used in calculating Diff; Bin, and Sigma. A number of features may be identified from the storage device metrics and computing system metrics (e.g., 457 features, etc.). However, not all of the features may distinguish between healthy and faulty storage devices, especially in the context of online prediction. Thus, the feature selector 135 may perform validation of features of the feature set by evaluating a validation training dataset using the features of the feature set.

In an example, the validation training dataset may be divided into a training dataset and a testing dataset by time. A prediction model may be trained using the training dataset. A reference accuracy result may be calculated by using the prediction model to predict a result in the testing dataset. A feature of the feature set may be removed, and the prediction model may be retrained without the feature of the feature set. A feature accuracy result may be calculated by using the retrained prediction model to predict a result in the testing dataset. The feature of the feature set may also be removed from the testing dataset. The feature of the feature set may be validated if the reference accuracy result is greater than the feature set accuracy result. In other words, if the predication model more accurately predicts the model without the feature than with the feature, the feature will be removed from the feature set because it is determined not to be a predictive feature.

The feature set generator 130 may create a modified feature set based on the validation. The feature selection process proves very useful in selecting relevant features for constructing machine learning models. Existing feature selection methods fall into two main categories, statistical indicators (e.g., Chi-Square, Mutual Information, etc.) and machine-learning based methods (e.g., Random Forest, etc.). Traditional feature selection methods may not achieve good prediction performance because of the existence of time-sensitive and environment-sensitive features. These features carry information that are highly relevant to the training period but may not be applicable for predicting samples in the next time period. These represent non-predictive features, meaning they have no predictive power in online prediction.

The model generator 140 may create a storage device failure model using the modified feature set. The storage device failure model may represent a probability that a given storage device is likely to fail. Having collected features from historical data, the storage device failure model (e.g., a prediction model) is then constructed to predict the error-proneness of storage devices in the coming days. The prediction problem is formulated as a ranking problem instead of a classification problem. That is, instead of simply telling whether a storage device is faulty or not, the storage devices are ranked according to their error-proneness. The ranking approach mitigates the problem of extreme imbalanced fault data because it is insensitive to the class imbalance.

To train a ranking model, historical fault data about the storage devices is obtained and the storage devices are ranked according to their relative time to fail (e.g., the number of days between the data is collected and the first error is detected). The concept of Learning to Rank is adopted which automatically learns an optimized ranking model from a large amount of data to minimize a loss function. A FastTree algorithm may be used, which is a form of "Multiple Additive Regression Trees" (MART) gradient boosting algorithm, to build each regression tree (e.g., which is a decision tree with scalar values in its leave) in a step wise fashion.

The comparator 145 may determine a storage device rating range by minimizing the cost of misclassification of a storage device. To improve service availability, new VMs 115 may be allocated to the healthier storage devices (e.g., those storage devices ranked as least error-prone, etc.) so that these VMs 115 are less likely to suffer from storage device errors in near future. To achieve this, faulty and healthy storage devices are identified based on their probability of being faulty. As most of the storage devices are healthy and only a small percentage of them are faulty, the top r results that are selected are returned by the ranking model as the faulty ones.

In an example, a first cost of misclassifying a storage device as having a high probability of failure may and a second cost of misclassifying the storage device as not having a high probability of failure may be identified. The storage device rating range may be a number of misclassified storage devices that result in the lowest sum of the number multiplied by each of the first cost and the second cost. For example, the optimal top r storage devices are selected in such a way that they minimize the total misclassification cost:

$$\text{cost} = \text{Cost1}*FP_r + \text{Cost2}*FN_r$$

, where $FP_r$ and $FN_r$ are the number of false positives and false negatives in the top r predicted results, respectively. Cost1 is the cost of wrongly identifying a healthy storage device as faulty, which involves the cost of unnecessary live migration from the "faulty" storage device to a healthy storage device. The migration process incurs an unneglectable cost and decreases the capacity of the cloud system. Cost2 is the cost of failing to identify a faulty storage device.

The values of Cost1 and Cost2 may be empirically determined by experts in product teams. In an example, due to the concerns about VM 115 migration cost and cloud capacity, Cost1 may be much higher than Cost2 (e.g., precision is valued more than recall). The ratio between Cost1 and Cost2 may be set, for example, to 3:1 by the domain experts. The number of false positives and false negatives are estimated through the false positive and false negative ratios obtained from historical data. The optimum r value is determined by minimizing the total misclassification cost. The top r storage devices are predicted faulty storage devices, which are high-risk storage devices and the VMs 115 hosted on them should be migrated out.

The comparator 145 may identify a set of storage devices to be labeled as having a high probability of failure. The set of storage devices may include a number of storage devices equal to the storage device rating range. A storage device in the set of storage devices may be ranked based on an evaluation of the storage device using the storage device failure model.

The ranked storage devices may be labeled for decommissioning (e.g., replacement, removal, data migration, etc.) by the storage manager 155 and may be avoided when new VMs 115 are generated in the cloud service infrastructure 105. Additionally, or alternatively, VM 115 data may be migrated from the labeled storage devices to healthy storage devices. The healthy storage devices may be identified as a range of storage devices ranked as having the lowest probability of failure. In an example, the number of healthy storage devices identified may be equal to the number of labeled storage devices, having a capacity equal to the data stored by the labeled storage devices, etc. In an example, data may be migrated off the labeled storage devices based on their ranking.

In an example, a healthy storage device may be identified based on an evaluation of the healthy storage device using the storage device failure model. Data of a virtual machine residing on a member storage device of the set of storage devices may be determined and the data of the virtual machine may be migrated from the member of storage device to the healthy storage device.

In another example, a healthy storage device may be identified based on an evaluation of the storage device using the storage device failure model. A request to create a new virtual machine 115 may be received and data of the virtual machine may be created on the healthy storage device rather than the set of storage devices.

The prediction models may be periodically updated to capture changes occurring in the cloud service infrastructure 105. For example, the storage device metrics and computing system metrics may be obtained daily, and the storage devices may be ranked and labeled each day. Feature selection may also be updated periodically as new features are identified or as the historical data is updated to indicate additional features that are predictive of storage device failure. Thus, the predictive model may evolve as new types of storage devices are added to the cloud storage system 110 and as the cloud service infrastructure 105 evolves. In addition, as new technology becomes available for managing the storage of the VMs 115, the costing function may be adjusted to allow for variable changes in the competing costs of false positive and false negative detection.

Figure 2:
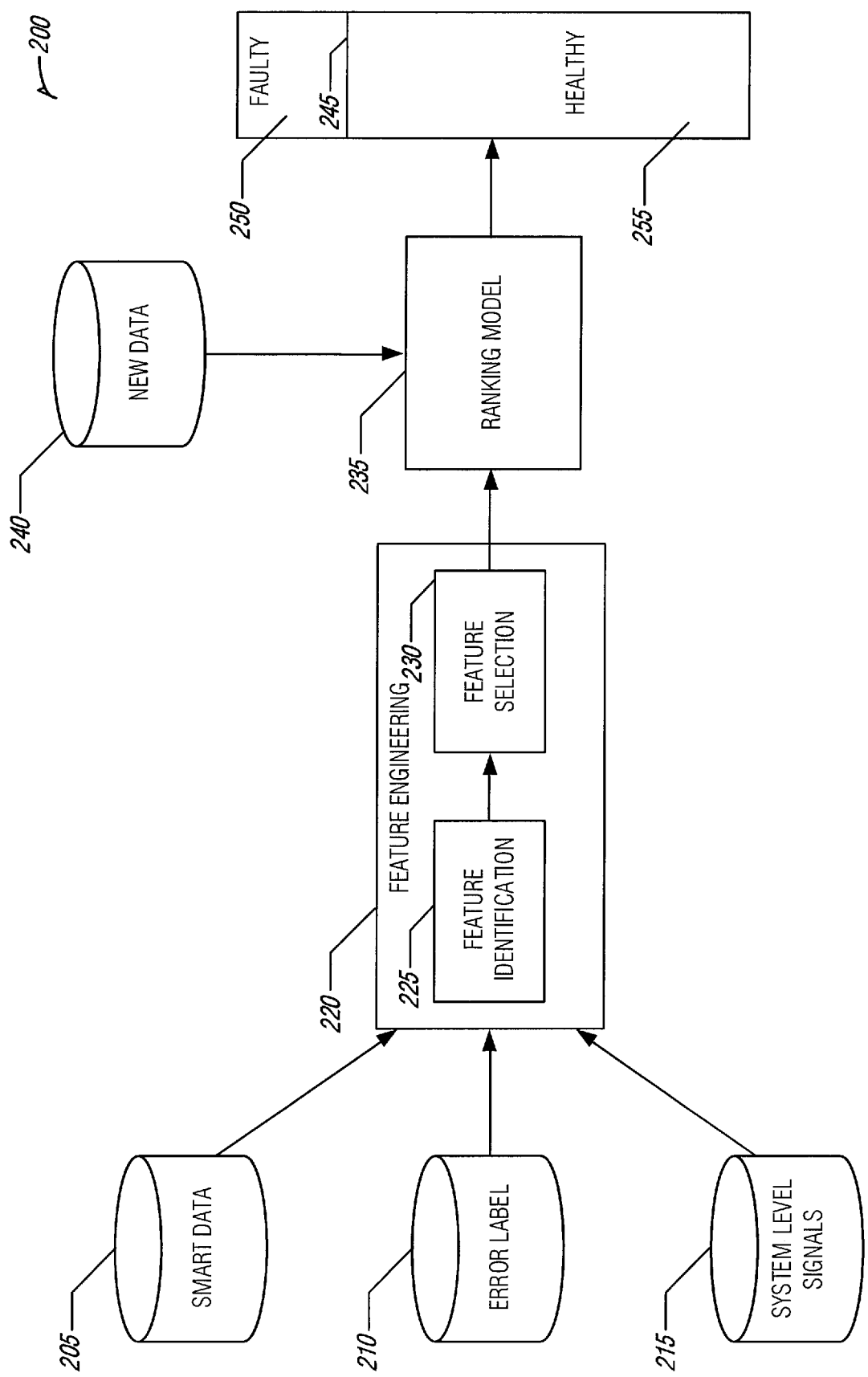
FIG. 2 is a flow diagram that illustrates an example of a process for multi-factor cloud service storage device error prediction, according to an embodiment.

FIG. 2 illustrates a flow diagram of an example of a process 200 for multi-factor cloud service storage device error prediction, according to an embodiment. The process 200 may provide features as described in FIG. 1.

The systems and techniques discussed herein predict the error-proneness of a storage device based the analysis of historical data. The ability to predict storage device errors may help improve service availability by proactively allocating VMs to a healthier storage device rather than to a faulty storage device and proactively migrate VMs from the predicted faulty storage devices to the healthy ones. A prediction model is built based on historical storage device error data using machine learning techniques and then the model is used to predict the likelihood of a storage device having errors in the near future. There are several technical challenges in designing the storage device error prediction model for a large-scale cloud service system:

(a) Extremely imbalanced data: For a large-scale cloud service system, each day, only three in ten thousand storage devices may become faulty. The imbalanced storage device failure ratio poses difficulties in training a classification model. Fed with such imbalanced data, a naive classification model may attempt to judge all storage devices to be healthy, because in this way, it has the lowest probability of making a wrong guess. Some approaches may apply data rebalancing techniques, such as over sampling and under sampling techniques, to attempt to address this challenge. These approaches may help raise recall, but at the same time, may introduce a large number of false positives, which may lead to decreased precision. Removing storage devices that are falsely detected may reduce capacity and may be costly as they may lead to unnecessary VM migration.

(b) Online prediction: Traditional solutions may approach the prediction problem in a cross-validation manner. However, cross-validation may not be the most effective solution for evaluating a storage device error prediction model. In cross validation, the dataset may be randomly divided into a training and a testing set. Therefore, it is possible that the training set may contain parts of future data and testing set may contain parts of past data. However, when it comes to online prediction (e.g., using historical data to train a model and predict future states), training and testing data will have no time overlap.

In storage device error prediction, some data, especially system-level signals, are time-sensitive (e.g., their values keep changing drastically over time) or environment-sensitive (e.g., their data distribution could change due to the ever-changing cloud environment). For example, if a rack of storage devices encounters an environmental change due to unstable voltage or OS upgrades, all storage devices on it will experience the change. Using cross validation, the environment-specific knowledge may spread to both training set and testing set. The knowledge learned from the training set could be applied to the testing set. Therefore, to construct an effective prediction model in practice, online prediction is used instead of cross-validation. The future knowledge should not be known at the time of prediction.

Cloud Disk Error Forecasting (CDEF), may improve service availability by predicting storage device errors. The process 200 shows an overview of CDEF. First, historical data is collected about faulty and health storage devices. The storage device error label 210 is obtained through root cause analysis of service issues by field engineers. The feature data includes S.M.A.R.T. data 205 and system-level signals 215.

CDEF addresses some of the challenges of storage device error detection in cloud systems by incorporating a feature engineering process 220. Features may be identified at operation 225. The features may include features based on raw data from the S.M.A.R.T. data 205 and system-level signals 215 corresponding to the error labels 210.

The features are then processed by a feature selection process 230 for selecting stable and predictive features. A ranking model 235 is generated and used to increase the accuracy of cost-sensitive online prediction. Features that are stable and predictive are selected for training at operation 230. Based on the selected features, a cost-sensitive ranking model 235 is constructed which ranks the storage devices.

The top r storage devices 245 that minimize the misclassification cost of predicted faulty storage devices may be identified. For example, the top one hundred most error-prone storage devices may be identified as faulty 250. The remainder of the storage devices may be unlabeled or may be labeled as healthy 255. As new data 240 is evaluated by the ranking model 235, the number of storage devices identified as faulty and the characteristics of storage devices identified as faulty may change.

Figure 3:
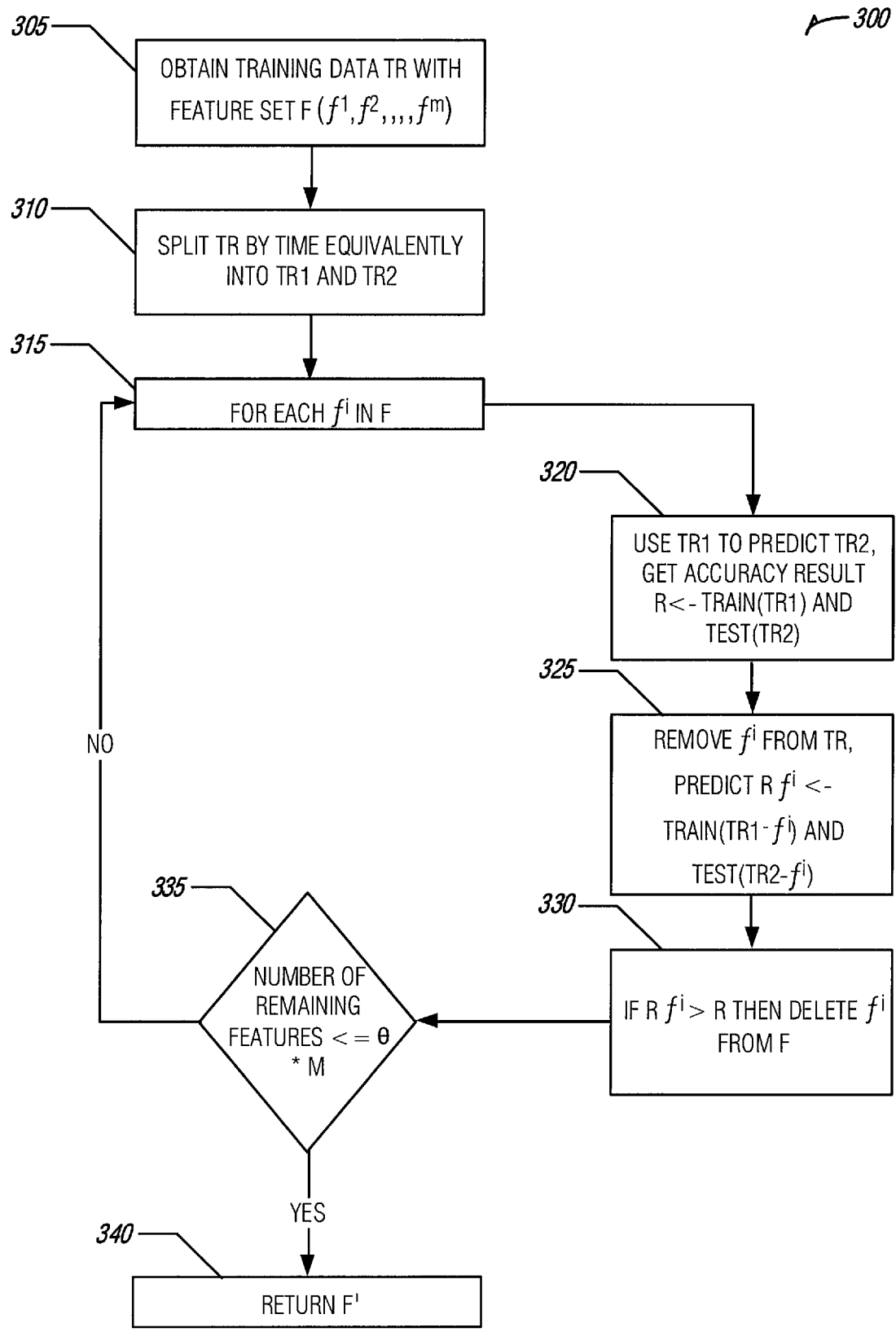
FIG. 3 is a flow diagram that illustrates an example of a process for feature selection for multi-factor cloud service storage device error prediction, according to an embodiment.

FIG. 3 illustrates a flow diagram of an example of a process 300 for feature selection for multi-factor cloud service storage device error prediction, according to an embodiment. The process 300 may provide features as described in FIGS. 1 and 2.

Some features such as, for example, SeekTimePerformance may be non-predictive features. Feature values of healthy storage devices over time in a training set, and feature values of faulty storage devices in the training set, may demonstrate that the mean feature value of healthy storage devices is lower than that of faulty storage devices. However, this may not be the case. The feature values of healthy and faulty storage devices over time in the testing set may demonstrate that the mean feature value of healthy storage devices is higher than that of faulty storage devices. Therefore, the behavior of this feature is not stable. Thus, the feature is considered to be a non-predictive feature and not suitable for online prediction. As a comparison, a predictive feature such as, for example, ReallocatedSectors, may demonstrate stable behavior—the values of healthy storage devices are close to zero and the values of faulty storage devices keep increasing over time, in both training and testing sets.

To select the stable and predictive features, the feature selection process 300 is performed to prune away the features that will perform poorly in prediction. The goal of the process 300 is to simulate online prediction on the training set.

Training data (TR) is obtained with a feature set F including features ($f_1, f_2, , , , , f_m$) (e.g., at operation 305). The training set is divided by time into two parts, one for training and the other for validation (e.g., at operation 310). Each feature $f_i$ of the feature set F is evaluated (e.g., at operation 315).

An accuracy result using a model including the feature is calculated (e.g., at operation 320). And an accuracy result is calculated using a model not including the feature (e.g., at operation 325). If the performance on the validation set gets better after deleting one feature, then the feature is deleted (e.g., at operation 330). Features are evaluated until the number of remaining features is less than θ% of the total number of the features (e.g., as determined at decision 335). In an example, θ is set to equal 10% by default, which means that the pruning process will stop if the number of remaining features is less than 10%. If the remaining features is above the threshold, additional features are evaluated (e.g., at operation 315). If the remaining features is below or equal to the threshold, a modified feature set is returned (e.g., at operation 340). The range of all selected features is then resealed using zero-mean normalization as follows: $x_{zero}$-mean=x-mean(X). The modified feature set includes the features determined to be predictive of storage device failure.

Figure 4:
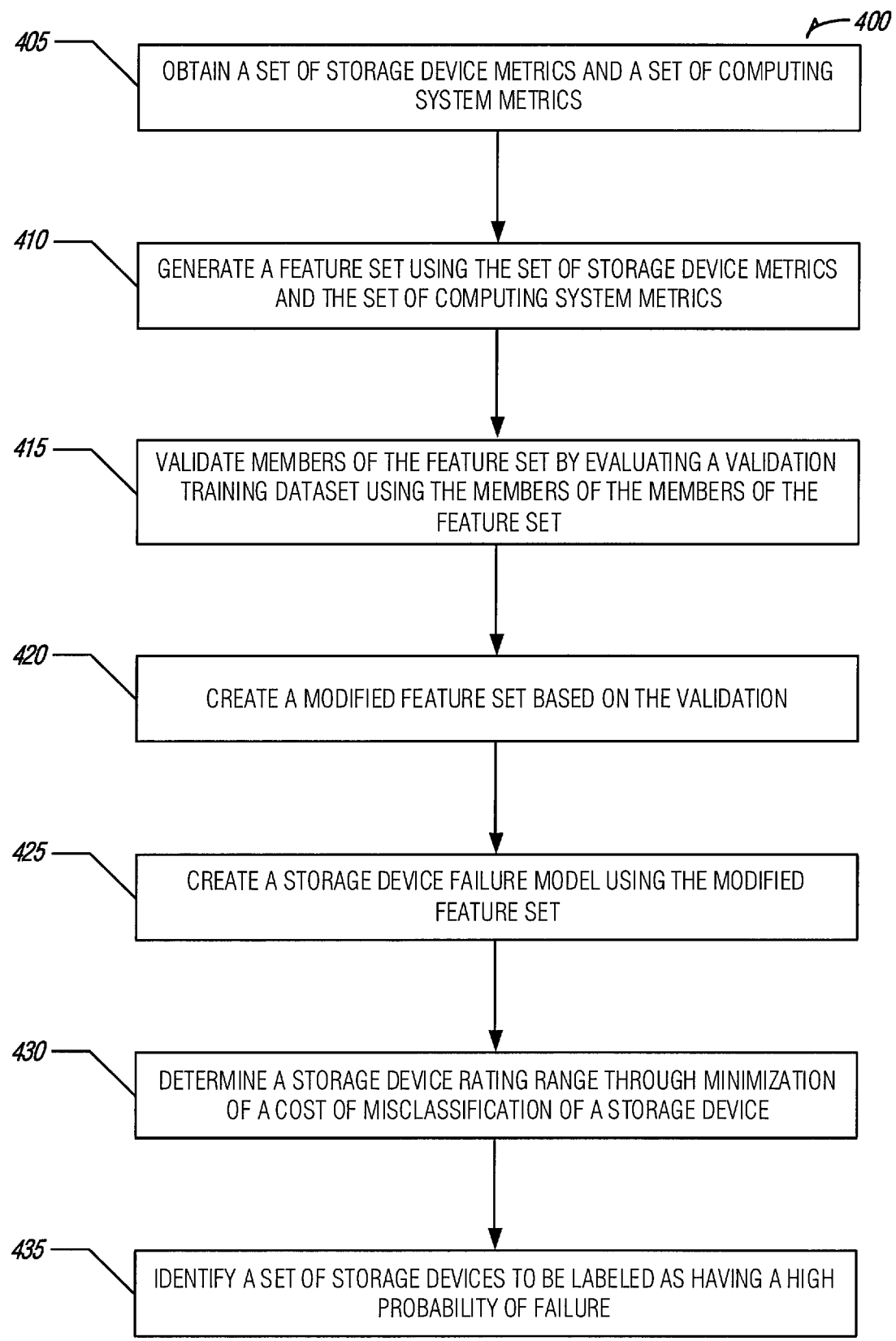
FIG. 4 is a flowchart that illustrates an example of a method for multi-factor cloud service storage device error prediction, according to an embodiment.

FIG. 4 illustrates an example of a method 400 for multi-factor cloud service storage device error prediction, according to an embodiment. The method 400 may provide features as described in FIGS. 1-3.

A set of storage device metrics and a set of computing system metrics may be obtained (e.g., by the metrics collector 125 as described in FIG. 1) (e.g., at operation 405). In an example, the set of storage device metrics may include self-monitoring, analysis, and reporting technology (S.M.A.R.T.) signals from storage devices in a cloud computing storage system. In an example, the set of computing system metrics includes system-level signals from virtual machines with operating system data residing on storage devices in a cloud computing storage system.

A feature set may be generated (e.g., by the feature set generator 130 as described in FIG. 1) using the set of storage device metrics and the set of computing system metrics (e.g., at operation 410). In an example, the feature set may include a statistical feature used to calculate a statistical value for a window of time included in a dataset.

Members of the feature set may be validated (e.g., by the feature selector 135 as described in FIG. 1) by evaluating a validation training dataset using the members of the feature set (e.g., at operation 415). In an example, the validation training dataset may be divided into a training dataset and testing dataset by time. A prediction model may be trained using the training dataset. A reference accuracy result may be calculated by using the prediction model to predict a result in the testing dataset. A member of the feature set may be removed, and the prediction model may be retrained without the member of the feature set. A feature accuracy result may be calculated by using the retrained prediction model to predict a result in the testing dataset, in a scenario where the member of the feature set has been removed from the testing dataset. The member of the feature set may be validated if the reference accuracy result is greater than the feature accuracy result.

A modified feature set may be created (e.g., by the feature set generator 130 as described in FIG. 1) based on the validation (e.g., at operation 420). A storage device failure model may be created (e.g., by the model generator 140 as described in FIG. 1) using the modified feature set (e.g., at operation 425). The storage device failure model may represent a probability that a given storage device is likely to fail.

A storage device rating range may be determined (e.g., by the comparator 145 as described in FIG. 1) by minimizing a cost of misclassification of a storage device (e.g., at operation 430). In an example, a first cost of misclassifying a storage device as having a high probability of failure and a second cost of misclassifying the storage device as not having a high probability of failure may be identified and the storage device rating range may be a number of misclassified storage devices that result in the lowest sum of the number multiplied by each of the first cost and the second cost.

A set of storage devices may be identified to be labeled as having a high probability of failure. The set of storage devices may include a number of storage devices equal to the storage device rating range. A storage device in the set of storage devices may be ranked based on an evaluation of the storage device using the storage device failure model.

In an example, a healthy storage device may be identified based on an evaluation of the healthy storage device using the storage device failure model. Data of a virtual machine residing on a member storage device of the set of storage devices may be determined and the data of the virtual machine from the member of storage device may be migrated to the healthy storage device.

In another example, a healthy storage device may be identified based on an evaluation of the healthy storage device using the storage device failure model. A request may be received to create a new virtual machine and data of the virtual machine may be created on the healthy storage device rather than the set of storage devices.

Figure 5:
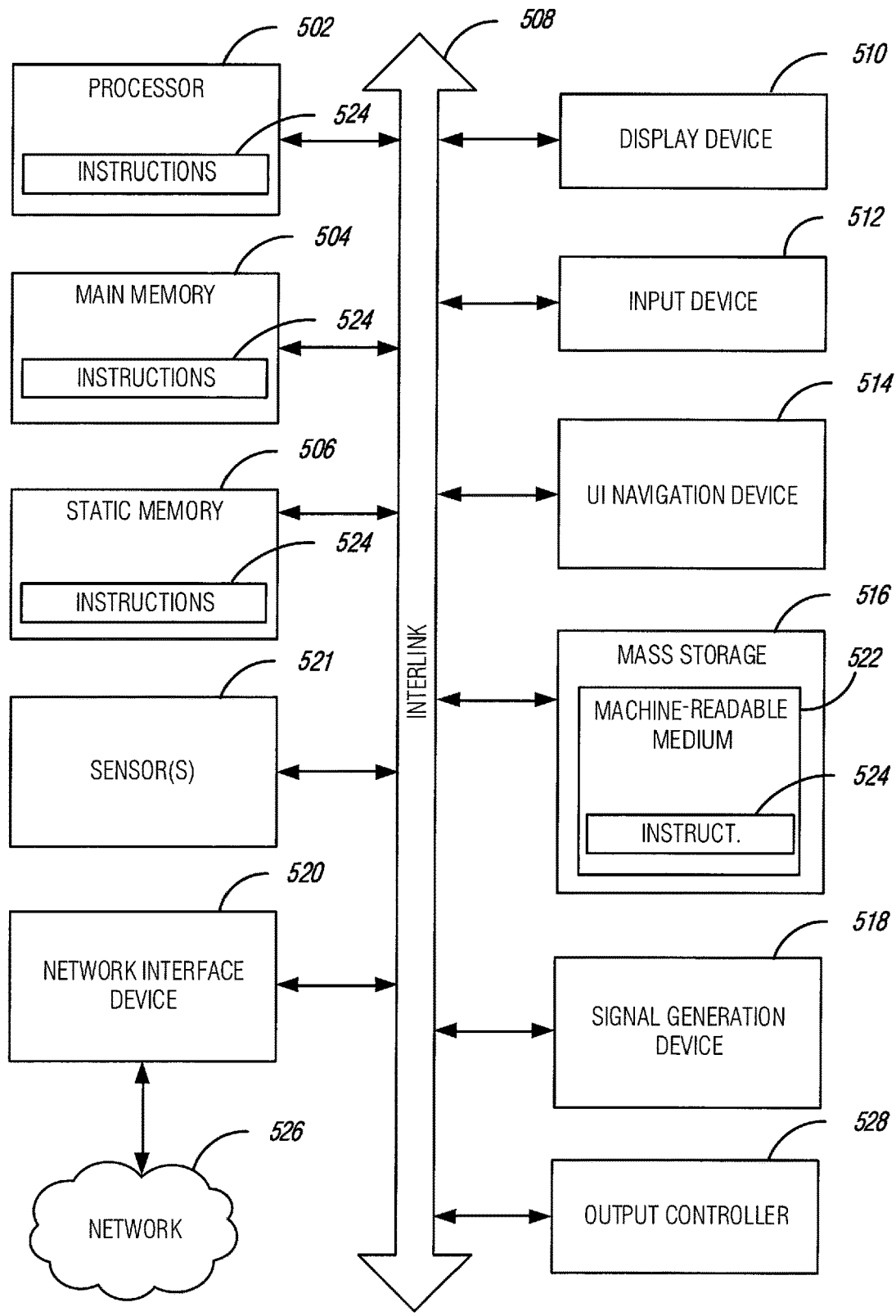
FIG. 5 is a block diagram that illustrates an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable media). Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; CD-ROM and DVD-ROM disks; etc.

In an example, machine readable medium may include storage devices in a cloud service platform (e.g., cloud service infrastructure 105, etc.). In an example, storage devices may include, hard disk drives (HDDs), solid state drives (SSDs), non-volatile memory (e.g., according to NVM Express® (NVMe) standard, Non-Volatile Memory Host Controller Interface Specification (NVMHCIS) standard, etc.), etc.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Example 1 is a system for proactive storage device error forecasting, the system comprising: at least one processor; and memory including instructions that, when executed by the at least one processor, cause the at least one processor to perform operations to: obtain a set of storage device metrics and a set of computing system metrics; generate a feature set using the set of storage device metrics and the set of computing system metrics; perform validation of features of the feature set by evaluating a validation training dataset using the features of the feature set; create a modified feature set including validated features of the feature set; create a storage device failure model using the modified feature set, wherein the storage device failure model determines a probability that a given storage device is likely to fail; determine a storage device rating range by minimization of a cost of misclassification of a storage device; and identify a set of storage devices to produce an indication of storage devices having a high probability of failure, wherein the set of storage devices includes, a number of storage devices within the storage device rating range, and wherein a storage device in the set of storage devices is ranked based on an evaluation of the storage device using the storage device failure model.

In Example 2, the subject matter of Example 1 includes, the memory further including instructions to: identify a healthy storage device based on an evaluation of the healthy storage device using the storage device failure model; determine data of a virtual machine residing on a member storage device of the set of storage devices; and migrate the data of the virtual machine from the member storage device to the healthy storage device.

In Example 3, the subject matter of Examples 1-2 includes, the memory further including instructions to: identify a healthy storage device based on an evaluation of the storage device using the storage device failure model; receive a request to create a new virtual machine; and create data of the new virtual machine on the healthy storage device in lieu of a storage device of the set of storage devices.

In Example 4, the subject matter of Examples 1-3 includes, wherein the instructions to perform validation of the features of the feature set further include instructions to: divide the validation training dataset into a training dataset and testing dataset by time; train a prediction model using the training dataset; calculate a reference accuracy result by using the prediction model to predict a result in the testing dataset; remove a feature of the feature set and retrain the prediction model without the feature of the feature set; calculate a feature accuracy result by using the retrained prediction model to predict a result in the testing dataset, wherein the feature of the feature set has been removed from the testing dataset; and validate the feature of the feature set if the reference accuracy result is greater than the feature accuracy result.

In Example 5, the subject matter of Examples 1-4 includes, wherein the set of storage device metrics includes self-monitoring, analysis, and reporting technology (S.M.A.R.T.) signals from storage devices in a cloud computing storage system.

In Example 6, the subject matter of Examples 1-5 includes, wherein the set of computing system metrics includes system-level signals from respective virtual machines with operating system data residing on storage devices in a cloud computing storage system.

In Example 7, the subject matter of Examples 1-6 includes, wherein the instructions to determine the storage device rating range further include instructions to: identify a first cost of misclassification of a storage device as having a high probability of failure and a second cost of misclassification of the storage device as not having a high probability of failure, wherein the storage device rating range is a number of misclassified storage devices that result in the lowest sum of the number multiplied by each of the first cost and the second cost.

In Example 8, the subject matter of Examples 1-7 includes, wherein the feature set includes a statistical feature used to calculate a statistical value for a window of time included in a dataset.

Example 9 is at least one machine-readable storage medium including instructions for proactive storage device error forecasting that, when executed by at least one processor, cause the at least one processor to perform operations to: obtain a set of storage device metrics and a set of computing system metrics; generate a feature set using the set of storage device metrics and the set of computing system metrics; perform validation of features of the feature set by evaluating a validation training dataset using the features of the feature set; create a modified feature set including validated features of the feature set; create a storage device failure model using the modified feature set, wherein the storage device failure model determines a probability that a given storage device is likely to fail; determine a storage device rating range by minimization of a cost of misclassification of a storage device; and identify a set of storage devices to produce an indication of storage devices having a high probability of failure, wherein the set of storage devices includes, a number of storage devices within the storage device rating range, and wherein a storage device in the set of storage devices is ranked based on an evaluation of the storage device using the storage device failure model.

In Example 10, the subject matter of Example 9 includes, instructions to: identify a healthy storage device based on an evaluation of the healthy storage device using the storage device failure model; determine data of a virtual machine residing on a member storage device of the set of storage devices; and migrate the data of the virtual machine from the member storage device to the healthy storage device.

In Example 11, the subject matter of Examples 9-10 includes, instructions to: identify a healthy storage device based on an evaluation of the storage device using the storage device failure model; receive a request to create a new virtual machine; and create data of the new virtual machine on the healthy storage device in lieu of a storage device of the set of storage devices.

In Example 12, the subject matter of Examples 9-11 includes, wherein the instructions to perform validation of features of the feature set further include instructions to: divide the validation training dataset into a training dataset and testing dataset by time; train a prediction model using the training dataset; calculate a reference accuracy result by using the prediction model to predict a result in the testing dataset; remove a feature of the feature set and retrain the prediction model without the feature of the feature set; calculate a feature accuracy result by using the retrained prediction model to predict a result in the testing dataset, wherein the feature of the feature set has been removed from the testing dataset; and validate the feature of the feature set if the reference accuracy result is greater than the feature accuracy result.

In Example 13, the subject matter of Examples 9-12 includes, wherein the set of storage device metrics includes self-monitoring, analysis, and reporting technology (S.M.A.R.T.) signals from storage devices in a cloud computing storage system.

In Example 14, the subject matter of Examples 9-13 includes, wherein the set of computing system metrics includes system-level signals from respective virtual machines with operating system data residing on storage devices in a cloud computing storage system.

In Example 15, the subject matter of Examples 9-14 includes, wherein the instructions to determine the storage device rating range further include instructions to: identify a first cost of misclassification of a storage device as having a high probability of failure and a second cost of misclassification of the storage device as not having a high probability of failure, wherein the storage device rating range is a number of misclassified storage devices that result in the lowest sum of the number multiplied by each of the first cost and the second cost.

In Example 16, the subject matter of Examples 9-15 includes, wherein the feature set includes a statistical feature used to calculate a statistical value for a window of time included in a dataset.

Example 17 is a method for proactive storage device error forecasting, the method comprising: obtaining a set of storage device metrics and a set of computing system metrics; generating a feature set using the set of storage device metrics and the set of computing system metrics; performing validation of features of the feature set by evaluating a validation training dataset using the features of the feature set; creating a modified feature set including validated features of the feature set; creating a storage device failure model using the modified feature set, wherein the storage device failure model determines a probability that a given storage device is likely to fail; determining a storage device rating range by minimizing a cost of misclassification of a storage device; and identifying a set of storage devices to produce an indication of storage devices having a high probability of failure, wherein the set of storage devices includes, a number of storage devices within the storage device rating range, and wherein a storage device in the set of storage devices is ranked based on an evaluation of the storage device using the storage device failure model.

In Example 18, the subject matter of Example 17 includes, identifying a healthy storage device based on an evaluation of the healthy storage device using the storage device failure model; determining data of a virtual machine residing on a member storage device of the set of storage devices; and migrating the data of the virtual machine from the member storage device to the healthy storage device.

In Example 19, the subject matter of Examples 17-18 includes, identifying a healthy storage device based on an evaluation of the storage device using the storage device failure model; receiving a request to create a new virtual machine; and creating data of the new virtual machine on the healthy storage device in lieu of a storage device of the set of storage devices.

In Example 20, the subject matter of Examples 17-19 includes, wherein performing validation of the features of the feature set further comprises: dividing the validation training dataset into a training dataset and testing dataset by time; training a prediction model using the training dataset; calculating a reference accuracy result by using the prediction model to predict a result in the testing dataset; removing a feature of the feature set and retraining the prediction model without the feature of the feature set; calculating a feature accuracy result by using the retrained prediction model to predict a result in the testing dataset, wherein the feature of the feature set has been removed from the testing dataset; and validating the feature of the feature set if the reference accuracy result is greater than the feature accuracy result.

In Example 21, the subject matter of Examples 17-20 includes, wherein the set of storage device metrics includes self-monitoring, analysis, and reporting technology (S.M.A.R.T.) signals from storage devices in a cloud computing storage system.

In Example 22, the subject matter of Examples 17-21 includes, wherein the set of computing system metrics includes system-level signals from respective virtual machines with operating system data residing on storage devices in a cloud computing storage system.

In Example 23, the subject matter of Examples 17-22 includes, wherein determining the storage device rating range further comprises: identifying a first cost of misclassifying a storage device as having a high probability of failure and a second cost of misclassifying the storage device as not having a high probability of failure, wherein the storage device rating range is a number of misclassified storage devices that result in the lowest sum of the number multiplied by each of the first cost and the second cost.

In Example 24, the subject matter of Examples 17-23 includes, wherein the feature set includes a statistical feature used to calculate a statistical value for a window of time included in a dataset.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for proactive storage device error forecasting, the system comprising:
    at least one processor; and
    memory including instructions that, when executed by the at least one processor, cause the at least one processor to perform operations to:
        obtain a set of storage device metrics and a set of computing system metrics, wherein the set of storage device metrics include self-monitoring, analysis, and reporting technology signals from storage devices in a cloud computing storage system and the set of computing system metrics includes system-level signals from virtual machines with operating system data residing on storage devices in the cloud computing storage system;
        generate a feature set including the set of storage device metrics and the set of computing system metrics;
        perform validation of features of the feature set by evaluating a validation training dataset using the features of the feature set;
        create a modified feature set including validated features of the feature set;
        create a storage device failure model using the modified feature set, wherein the storage device failure model determines a probability that a given storage device is likely to fail;
        determine a storage device rating range by minimization of a cost of misclassification of a storage device, wherein a first cost of misclassification of a storage device is identified as having a high probability of failure and a second cost of misclassification of the storage device is identified as not having a high probability of failure, wherein the storage device rating range is a number of misclassified storage devices that result in the lowest sum of the number multiplied by each of the first cost and the second cost;
        identify a set of storage devices to produce an indication of storage devices having a high probability of failure, wherein the set of storage devices includes a number of storage devices within the storage device rating range, and wherein a storage device in the set of storage devices is ranked based on an evaluation of the storage device using the storage device failure model; and
        migrate a virtual machine instance from a first storage device of the set of storage devices to a second storage device of the set of storage devices based on the ranked set of storage devices.

2. The system of claim 1, the memory further including instructions to:
    identify a healthy storage device based on an evaluation of the healthy storage device using the storage device failure model;
    determine data of a virtual machine residing on a member storage device of the set of storage devices; and
    migrate the data of the virtual machine from the member storage device to the healthy storage device.

3. The system of claim 1, the memory further including instructions to:
    identify a healthy storage device based on an evaluation of the storage device using the storage device failure model;
    receive a request to create a new virtual machine; and
    create data of the new virtual machine on the healthy storage device in lieu of a storage device of the set of storage devices.

4. The system of claim 1, wherein the instructions to perform validation of the features of the feature set further include instructions to:
    divide the validation training dataset into a training dataset and testing dataset by time;
    train a prediction model using the training dataset;
    calculate a reference accuracy result by using the prediction model to predict a result in the testing dataset;
    remove a feature of the feature set and retrain the prediction model without the feature of the feature set;
    calculate a feature accuracy result by using the retrained prediction model to predict a result in the testing dataset, wherein the feature of the feature set has been removed from the testing dataset; and
    validate the feature of the feature set if the reference accuracy result is greater than the feature accuracy result.

5. The system of claim 1, wherein the set of storage device metrics includes self-monitoring, analysis, and reporting technology (S.M.A.R.T.) signals from storage devices in a cloud computing storage system.

6. The system of claim 1, wherein the set of computing system metrics includes system-level signals from respective virtual machines with operating system data residing on storage devices in a cloud computing storage system.

7. The system of claim 1, wherein the feature set includes a statistical feature used to calculate a statistical value for a window of time included in a dataset.

8. A method for proactive storage device error forecasting, the method comprising:
    obtaining a set of storage device metrics and a set of computing system metrics;

generating a feature set include the set of storage device metrics and the set of computing system metrics, wherein the set of storage device metrics include self-monitoring, analysis, and reporting technology signals from storage devices in a cloud computing storage system and the set of computing system metrics includes system-level signals from virtual machines with operating system data residing on storage devices in the cloud computing storage system;

performing validation of features of the feature set by evaluating a validation training dataset using the features of the feature set;

creating a modified feature set including validated features of the feature set;

creating a storage device failure model using the modified feature set, wherein the storage device failure model determines a probability that a given storage device is likely to fail;

determining a storage device rating range by minimizing a cost of misclassification of a storage device, wherein a first cost of misclassification of a storage device is identified as having a high probability of failure and a second cost of misclassification of the storage device is identified as not having a high probability of failure, wherein the storage device rating range is a number of misclassified storage devices that result in the lowest sum of the number multiplied by each of the first cost and the second cost;

identifying a set of storage devices to produce an indication of storage devices having a high probability of failure, wherein the set of storage devices includes a number of storage devices within the storage device rating range, and wherein a storage device in the set of storage devices is ranked based on an evaluation of the storage device using the storage device failure model; and migrating a virtual machine instance from a first storage device of the set of storage devices to a second storage device of the set of storage devices based on the ranked set of storage devices.

9. The method of claim 8, further comprising:
identifying a healthy storage device based on an evaluation of the healthy storage device using the storage device failure model;
determining data of a virtual machine residing on a member storage device of the set of storage devices; and
migrating the data of the virtual machine from the member storage device to the healthy storage device.

10. The method of claim 8, further comprising:
identifying a healthy storage device based on an evaluation of the storage device using the storage device failure model;
receiving a request to create a new virtual machine; and
creating data of the new virtual machine on the healthy storage device in lieu of a storage device of the set of storage devices.

11. The method of claim 8, wherein performing validation of the features of the feature set further comprises:
dividing the validation training dataset into a training dataset and testing dataset by time;
training a prediction model using the training dataset;
calculating a reference accuracy result by using the prediction model to predict a result in the testing dataset;
removing a feature of the feature set and retraining the prediction model without the feature of the feature set;
calculating a feature accuracy result by using the retrained prediction model to predict a result in the testing dataset, wherein the feature of the feature set has been removed from the testing dataset; and
validating the feature of the feature set if the reference accuracy result is greater than the feature accuracy result.

12. The method of claim 8, wherein the feature set includes a statistical feature used to calculate a statistical value for a window of time included in a dataset.

13. At least one non-transitory machine-readable medium including instructions for proactive storage device error forecasting that, when executed by at least one processor, cause the at least one processor to perform operations to:

obtain a set of storage device metrics and a set of computing system metrics;

generate a feature set include the set of storage device metrics and the set of computing system metrics, wherein the set of storage device metrics include self-monitoring, analysis, and reporting technology signals from storage devices in a cloud computing storage system and the set of computing system metrics includes system-level signals from virtual machines with operating system data residing on storage devices in the cloud computing storage system;

perform validation of features of the feature set by evaluating a validation training dataset using the features of the feature set;

create a modified feature set including validated features of the feature set;

create a storage device failure model using the modified feature set, wherein the storage device failure model determines a probability that a given storage device is likely to fail;

determine a storage device rating range by minimizing a cost of misclassification of a storage device, wherein a first cost of misclassification of a storage device is identified as having a high probability of failure and a second cost of misclassification of the storage device is identified as not having a high probability of failure, wherein the storage device rating range is a number of misclassified storage devices that result in the lowest sum of the number multiplied by each of the first cost and the second cost;

identify a set of storage devices to produce an indication of storage devices having a high probability of failure, wherein the set of storage devices includes a number of storage devices within the storage device rating range, and wherein a storage device in the set of storage devices is ranked based on an evaluation of the storage device using the storage device failure model; and migrate a virtual machine instance from a first storage device of the set of storage devices to a second storage device of the set of storage devices based on the ranked set of storage devices.

14. The at least one non-transitory machine-readable medium of claim 13, further comprising instructions that, when executed by at least one processor, cause the at least one processor to perform operations to:
identify a healthy storage device based on an evaluation of the healthy storage device using the storage device failure model;
determine data of a virtual machine residing on a member storage device of the set of storage devices; and
migrate the data of the virtual machine from the member storage device to the healthy storage device.

15. The at least one non-transitory machine-readable medium of claim 13, further comprising instructions that, when executed by at least one processor, cause the at least one processor to perform operations to:
- identify a healthy storage device based on an evaluation of the storage device using the storage device failure model;
- receive a request to create a new virtual machine; and
- create data of the new virtual machine on the healthy storage device in lieu of a storage device of the set of storage devices.

16. The at least one non-transitory machine-readable medium of claim 13, the instructions to perform validation of the features of the feature set further comprising instructions that, when executed by at least one processor, cause the at least one processor to perform operations to:
- divide the validation training dataset into a training dataset and testing dataset by time;
- train a prediction model using the training dataset;
- calculate a reference accuracy result by using the prediction model to predict a result in the testing dataset;
- remove a feature of the feature set and retraining the prediction model without the feature of the feature set;
- calculate a feature accuracy result by using the retrained prediction model to predict a result in the testing dataset, wherein the feature of the feature set has been removed from the testing dataset; and
- validate the feature of the feature set if the reference accuracy result is greater than the feature accuracy result.

17. The at least one non-transitory machine-readable medium of claim 13, wherein the feature set includes a statistical feature used to calculate a statistical value for a window of time included in a dataset.

\* \* \* \* \*